Patented July 30, 1935

2,009,661

UNITED STATES PATENT OFFICE 2,009,661

DENATURED ALCOHOL AND DENATURANT FOR THE SAME

Joseph Hidy James, Pittsburgh, Pa., assignor to Clarence P. Byrnes, trustee

No Drawing. Application June 30, 1926,
Serial No. 119,750

17 Claims. (Cl. 202—77)

My invention relates to the denaturing of ethyl alcohol. Persons desiring to make illegal use of ethyl alcohol have found methods for removing ordinary denaturants therefrom by distillation or chemical treatment or both.

My invention is designed to provide a denaturant for alcohol which can not be separated or removed from the ethyl alcohol by distillation or chemical treatment without destroying or injuring the alcohol itself. In several copending applications, such as Serial No. 222,567, filed January 22, 1919; Serial No. 281,124, filed March 7, 1919; Serial No. 435,355, filed January 6, 1921, etc., I have described vapor phase catalytic processes for making intermediate partial oxidation products from liquid hydrocarbons, such as petroleum, petroleum fractions, shale oils or oils from the low temperature distillation of coal. In the said processes, the liquid hydrocarbon is vaporized, mixed with air or an oxygen-containing gas in regulated proportions near the theoretical combining proportion, or preferably in excess thereof, the heated mixture being, passed with or without the addition of a diluting gas, such as steam, through a layer or in contact with a catalyst under a regulated temperature, preferably between 170° C. or 180° C. and 500° C. The catalysts employed are preferably complex oxides or compounds of metals having a varying valence, such, for example, as the blue oxides of molybdenum. The resulting gaseous products are condensed, preferably first indirectly and then directly, by contact with water or liquid, giving a complex liquid mixture of partial oxidation products ranging from alcohols through aldehydes to aldehyde fatty acids. The percentages of the various constitutents may be varied by varying the factors of the process, such as temperature, air ratio, speed of stream, etc. The liquid hydrocarbon generally employed is a fraction or cut of mineral oil, such as petroleum-containing hydrocarbons of different molecular weights, and hence, each class of constituents of the product contains constituents of different molecular weights in the solution mixture.

In case a series of screens or layers of a solid catalyst is used, as in case Serial No. 435,355, air or oxygen containing gas is preferably added at various points before passing the screens and between the screens.

The products thus condensed consist of practically all of the oxidized derivatives of aliphatic and naphthenic hydrocarbons. The chains of the naphthenic hydrocarbons usually open out under the conditions of partial oxidation. These condensed products usually include alcohol, aldehyde alcohols, aldehydes, ketones, aldehyde acids, aldehyde hydroxy acids, keto acids, hydroxy keto acids or esters of these acids, these esters being of the normal ester type and of the lactonic type; and also in fairly large proportions, ethers, both of the normal type and of the inner or "bridge" type. In addition to these condensed products, the condensed liquid material contains hydrocarbons formed by thermal decompositions of the oxidized products in the apparatus itself and incidental to the process. Such hydrocarbons are largely of the highly unsaturated type, and hence carry persistent, penetrating odors. Hence, in my catalytic vapor phase oxidation process which is above described, the oxidized bodies are partially unsaturated and hence possess, as do the hydrocarbons formed during the process, characteristic, persistent and penetrating odors.

As described in the above patent applications, the product mixture or solution contains a certain proportion of low boiling point compounds, due probably to the decomposition effects during the reactions.

I have discovered that such liquid oxidation product is of great value in denaturing ethyl alcohol, since with such a mixture of partial oxidation bodies of different molecular weights, the denaturant can not be removed from the alcohol by distillation or any chemical treatment or reaction short of the actual destruction of the alcohol itself.

In preparing the denaturant, I prefer to carry out the catalytic partial oxidation process, preferably by the use of multiple screens of the catalyst, as fully set forth in my copending application, Serial No. 435,355, air or oxygen-containing gas being supplied at a plurality of points before passing and during the passing through the screens under the regulated temperature and conditions fully described therein. I prefer to employ as the raw material petroleum fractions from the naphtha boiling range through the kerosene boiling range, although I may employ fractions in higher or lower boiling ranges or extending into higher or lower boiling ranges.

In utilizing the liquid condensed product mixture, I prefer to remove any free organic acids present. This may be carried out by caustic neutralization or by lime water scrubbing or in any desired way. I may remove the more highly oxidized bodies from the complex liquid reaction mixture. For example, by a solution extraction, such as set forth in my copending application, Serial No. 745,024, filed October 21, 1924, I have found that ordinary (95%) alcohol has the property of selective dissolving of the esters and more highly oxidized bodies of the product mixture, and that if water in carefully regulated amounts be added to such alcohol, the quantity and character of the oxidized bodies taken out of the mixture into the alcohol layer can be nicely controlled. Hence, by mixing the condensed liquid oxidation product with various admixtures of water and alcohol, I can proportion the solvent against this partial oxidation mixture, in such a manner that only the more highly oxidized bodies pass into solution in the alcohol layer which is formed. By drawing off the lower dilute alcohol layer in any suitable way, I therefore extract the more highly oxidized bodies. I can then separate the dilute alcohol and the oxidized bodies, if desired, and thus can re-use nearly all of the alcohol used in the extraction process. I also preferably distil the liquid partial oxidation product, preferably before the alcohol extraction, although this may be done as a later separate operation. I can therefore adjust the distillation curve of the denaturant, so that when mixed with the alcohol, the distilling of the denatured alcohol can not remove the odor and taste. In other words, the denaturant spreads itself throughout the whole boiling range of my partial oxidation condensate which may be adjusted to the distilling curve of the alcohol. As an example of actual use my denaturant consisting of a fraction of liquid oxidation product, with acids removed, has been added in the proportion of ¾ of 1%, to ethyl alcohol, together with other denaturants such as wood alcohol and kerosene.

In the alcohol extraction process applied to my partial oxidation product mixture, I may employ either diluted ethyl alcohol or diluted methyl alcohol as the solvent for the more highly oxidized bodies. In the present case, I prefer to carry into the alcohol layer during extraction a certain proportion of the low molecular weight unsaturated hydrocarbons, and hence prefer to vary the procedure recited in Serial No. 745,024, by reducing the percentage of water in the extracting solvent, thus taking out a larger percentage which adds to the value of the product for the desired purpose, namely, to obtain a denaturant which has a peculiar, penetrating odor and sickening taste, and which can not be completely removed by dilution, distillation or any chemical reaction, short of destroying the ethyl alcohol itself. After extraction, the water may be removed by any suitable dehydrating agent and distilling off the alcohol, although this step may be carried out by distillation.

While I prefer to use the denaturant prepared as above described, I may, if desired, emphasize and increase the objectionable odor and taste thereof by chemically tying into certain of its components such elements or compounds as the halogens or sulphur, selenium and tellurium or compounds thereof. If sulphur is introduced, it may be chemically tied into the product to increase its noxious characteristics by the method set forth in my copending application, Serial No. 115,677, filed June 12, 1926. As set forth in said application, sulphur may be added by heating the liquid oxidation mixture with sulphur in connection with the use of any well known "sulphur combined catalysts", such as have been found effective for accelerators in rubber vulcanizing, for example, aniline, thiocarbanalide, resins, etc. Both sulphur and chlorine may be carried in by causing a reaction between the product and sulphur monochloride. I may also convert a part of the alcohols of the reaction mixture into xanthates by adding carbon disulphide and an alkali, such as caustic soda. A small proportion of these xanthates will remain in solution in the denaturant to add to its noxious character.

The essence of my invention lies in the discovery of the advantage of the partial oxidation product of hydrocarbons or liquid portions thereof as a denaturant for alcohol. As above described, this complex product mixture is of special advantage in having low boiling point materials and the spreading of the odor and taste throughout the whole of the range of the condensate. Furthermore, by adjusting the characteristics of the liquid, it can be given a distillation curve such that on distilling alcohol containing a small portion of this denaturant, the odor and taste will be present in all parts of the distilled product. Hence, it is impossible to completely remove the noxious odor and taste from any commercially material portion of the denatured alcohol. By the term "aldehyde-like bodies", I mean the type of bodies produced by the main James process such as set forth in his Patent #1,697,653, granted Jan. 1, 1929, which has the characteristic aldehyde odor and usually contains an aldehyde group.

Changes may be made in the partial oxidation process, in the manner of condensing the product and in the treatment of the product or fractions thereof, without departing from the spirit of my invention.

I claim:

1. As a new article of manufacture, ethyl alcohol containing as a denaturant a liquid partial oxidation product of liquid hydrocarbons containing alcohols and aldehydes.

2. As a new article of manufacture, ethyl alcohol containing as a denaturant a fraction of a liquid partial oxidation product of liquid hydrocarbons containing alcohols and aldehydes the boiling range of said fraction extending substantially throughout the distilling curve of the alcohol.

3. As a new article of manufacture, ethyl alcohol containing as a denaturant a liquid partial oxidation product of liquid hydrocarbon containing alcohols and aldehydes of different molecular weights.

4. As a new article of manufacture, ethyl alcohol containing as a denaturant a fraction of a liquid partial oxidation product of liquid hydrocarbons containing alcohols and aldehydes of different molecular weights the boiling range of said fraction extending substantially throughout the distilling curve of the alcohol.

5. As a new article of manufacture, ethyl alcohol containing as a denaturant a liquid partial oxidation product of liquid hydrocarbons containing alcohols and aldehydes substantially free from organic acids.

6. As a new article of manufacture, an alcohol denaturant containing a fraction of a liquid partial oxidation product of liquid hydrocarbons containing alcohols and aldehydes the boiling range of said fraction extending substantially throughout the distilling curve of the alcohol.

7. As a new article of manufacture, an alcohol denaturant containing a liquid partial oxidation product of liquid hydrocarbons containing a material percentage of aldehyde-like bodies and unsaturated compounds each of different molecular weights, said denaturant being substantially free from free organic acids.

8. A composition of matter comprising a mixture of oxygen derivatives of mineral oil of different molecular weights as a denaturant for alcohol.

9. A composition of matter comprising a mixture of oxygen derivatives of mineral oil of different molecular weights and substantially free from free organic acids as a denaturant for alcohol.

10. A composition of matter comprising a liquid partial oxidation product of mineral oil containing oxygen derivatives of different molecular weights as a denaturant for alcohol.

11. A composition of matter comprising a fraction of a liquid partial oxidation product of mineral oil containing oxygen derivatives of different molecular weights as a denaturant for alcohol.

12. A composition of matter comprising a liquid partial oxidation product of mineral oil containing oxygen derivatives of different molecular weights and substantially free from free organic acid as a denaturant for alcohol.

13. A composition of matter comprising a mixture containing aliphatic alcohols derived from mineral oil and of different molecular weights as a denaturant for alcohol.

14. A composition of matter comprising a mixture containing aliphatic alcohols of different molecular weights including an alcohol having more carbon atoms than heptane as a denaturant for alcohol.

15. As a new article of manufacture, alcohol containing a denaturant comprising a mixture of oxygen derivatives of mineral oil of different molecular weights and substantially free from free organic acid.

16. As a new article of manufacture, alcohol containing a denaturant comprising a fraction of a partial oxidation product of mineral oil containing oxygen derivatives of different molecular weights.

17. As a new article of manufacture, alcohol containing a denaturant comprising a mixture of aliphatic alcohols derived from mineral oil and of different molecular weights and substantially free from free organic acid.

JOSEPH HIDY JAMES.